United States Patent [19]

Bruns

[11] Patent Number: 5,714,695
[45] Date of Patent: Feb. 3, 1998

[54] HELICAL LOAD CELL

[75] Inventor: Robert W. Bruns, Sacramento, Calif.

[73] Assignee: Sentek Products, Rancho Cordova, Calif.

[21] Appl. No.: 795,593

[22] Filed: Feb. 4, 1997

[51] Int. Cl.⁶ .................................................. G01L 1/04
[52] U.S. Cl. .............................. 73/862.641; 73/862.636; 177/211; 177/225
[58] Field of Search ............... 73/862.392, 862.393, 73/862.474, 862.627, 862.635, 862.641; 177/211, 225, 232, 234

[56] References Cited

U.S. PATENT DOCUMENTS

| | | | |
|---|---|---|---|
| 1,288,953 | 12/1918 | Mazewicz | 73/862.641 X |
| 2,467,752 | 4/1949 | Howe | 177/211 X |
| 2,570,321 | 10/1951 | Christoffer | 73/862.393 X |
| 2,582,886 | 1/1952 | Ruge | 73/141 |
| 2,681,566 | 6/1954 | Ruge | 177/225 |
| 2,813,709 | 11/1957 | Brier | 265/42 |
| 3,736,795 | 6/1973 | Anderson | 73/862.635 X |
| 3,842,667 | 10/1974 | Alexander et al. | 73/862.641 |
| 3,933,150 | 1/1976 | Brosh et al. | 177/211 |
| 4,090,399 | 5/1978 | Babcock | 73/862.641 X |
| 4,159,748 | 7/1979 | Staudinger et al. | 177/225 |
| 4,212,360 | 7/1980 | Chesher | 177/139 |
| 4,285,234 | 8/1981 | Basily et al. | 73/862.635 |
| 4,386,386 | 5/1983 | Akita | 73/862.641 X |
| 5,220,971 | 6/1993 | Farr | 177/229 |
| 5,360,950 | 11/1994 | Cheng | 177/232 |
| 5,461,933 | 10/1995 | Ives et al. | 73/862.623 |

OTHER PUBLICATIONS

LaVar Clegg, "Bonded Foil Strain Gauge Force Tranducers", *Sensors*, pp. 68–75 (Oct. 1996).

Product brochure for "Compression Only / Thru Hole Load Washer".

*Primary Examiner*—Elizabeth L. Dougherty
*Attorney, Agent, or Firm*—Thomas Schneck; George B.F. Yee

[57] ABSTRACT

A helical load cell is disclosed which is capable of accurately measuring axially applied forces, whether the force is applied axially within the diameter of the helical coil or outside of the coil diameter. A pair of strain gage modules are disposed on diametrically opposed surfaces of the coil. Each module includes a pair of transducer elements disposed orthogonally with respect to each other and at forty-five degrees relative to a neutral axis of the coil. The modules are coupled in an additive bridge circuit arrangement. In one embodiment, the modules are disposed along the outside diameter of the coil. In another embodiment, the modules are disposed along the inside diameter of the coil. In yet another embodiment, the modules are dispose on the upper or lower surface of the coil. In yet another embodiment, a second pair of strain gage modules is provided and coupled in a subtractive bridge circuit. The second pair of modules provides information as to the location of the applied load.

26 Claims, 8 Drawing Sheets

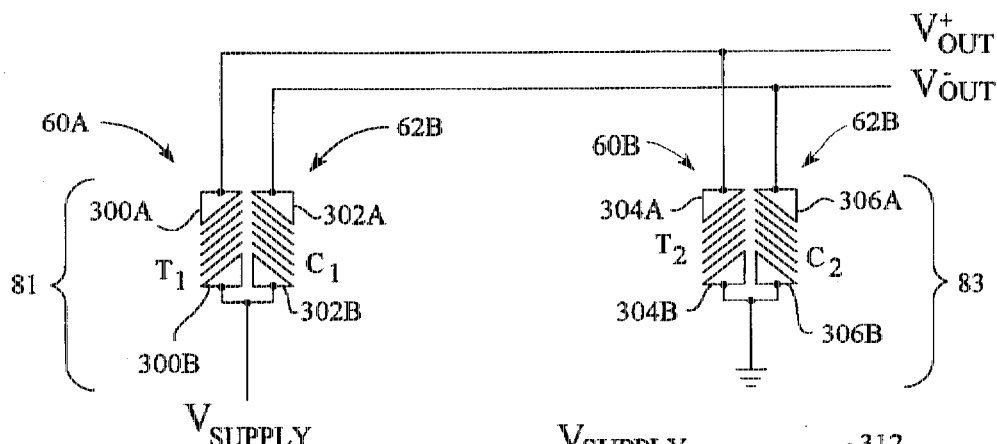
FIG. 4C
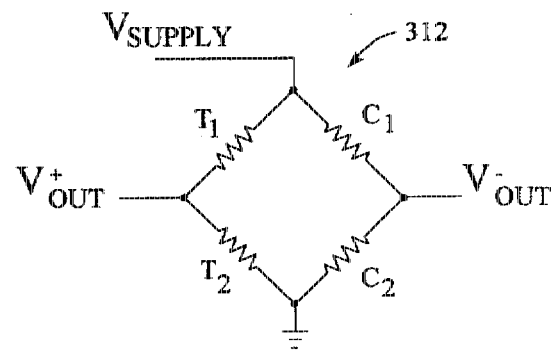
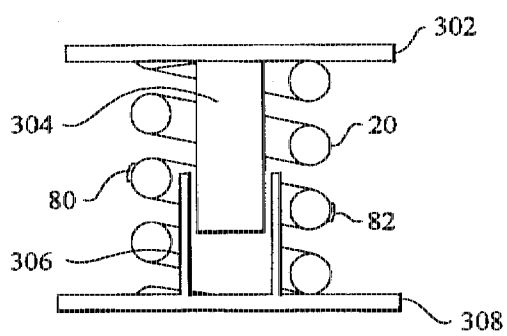
FIG. 5A
FIG. 5B
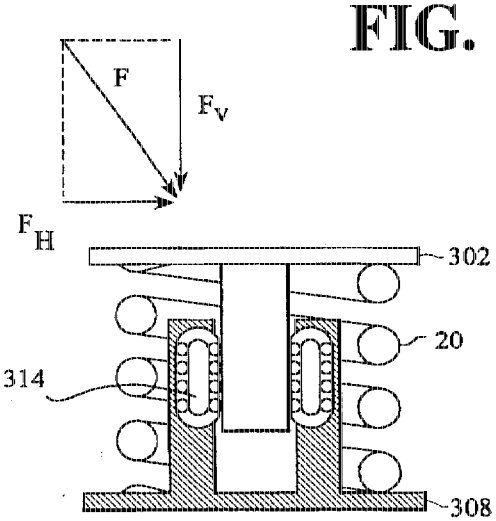
FIG. 5C

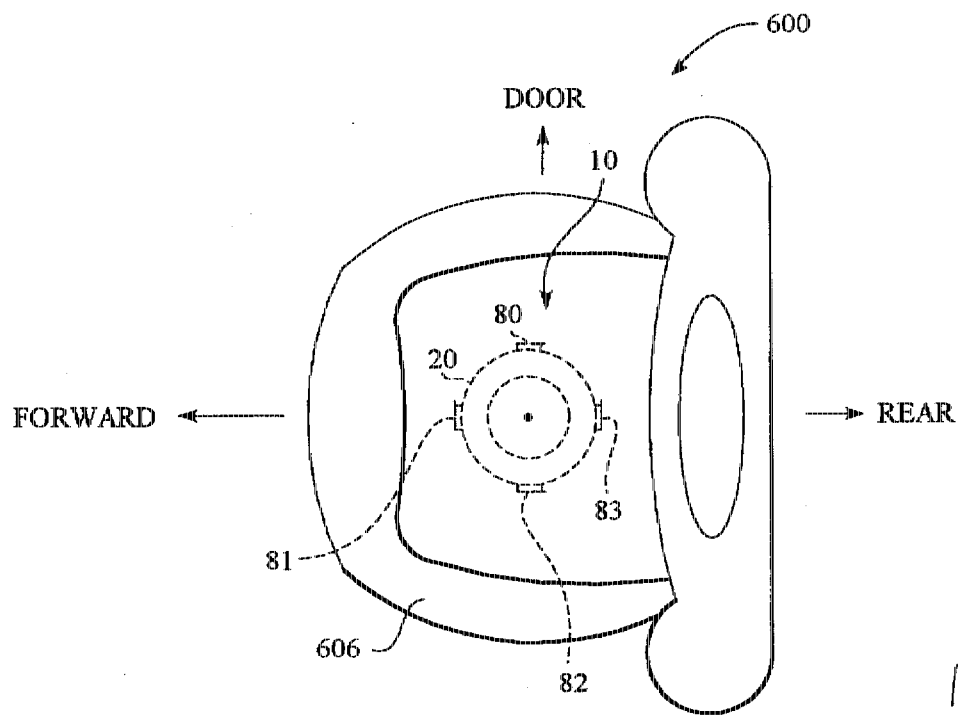
FIG. 10B
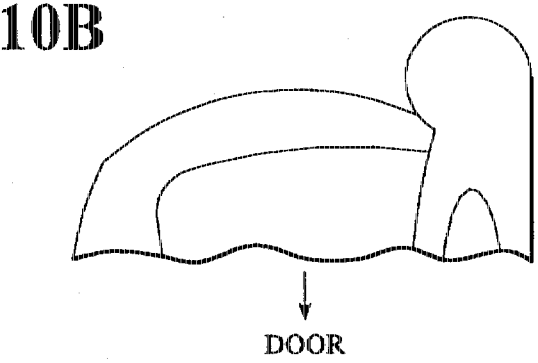
FIG. 10A
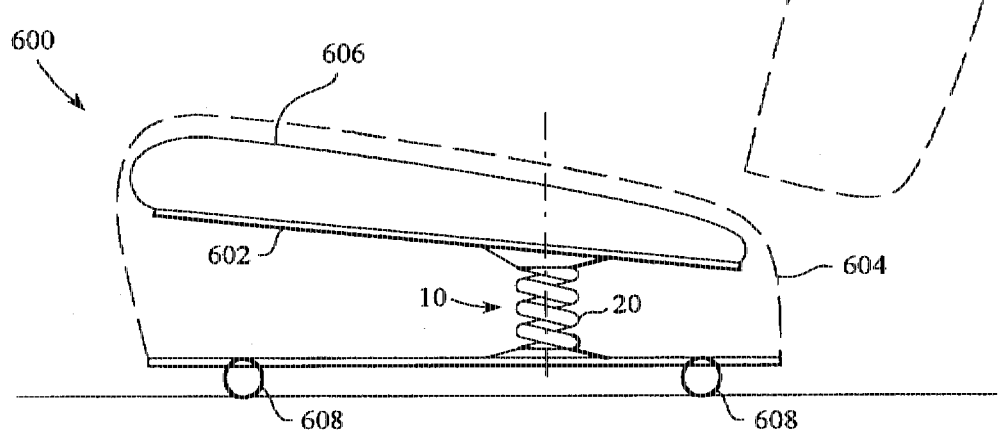

HELICAL LOAD CELL

TECHNICAL FIELD OF THE INVENTION

The present invention relates generally to load cells, and more specifically to a load cell which is insensitive to the position of the loading force.

BACKGROUND ART

Load cells are used to provide accurate measurements of compressive or tensile forces. Typically, the force creates a strain in the load cell which is measured by strain gage transducers. Accurate measurements, however, require that the force be applied along an axis which is central to the load cell and about which all the transducers are symmetrically placed.

An example of such a load cell which is sensitive to the effects of off-axis loading is known as a compression washer. U.S. Pat. No. 4,212,360 discloses such a load cell (FIGS. 4a and 4b), an example of which is shown in a product brochure entitled "Compression Only/Thru Hole Load Washer". As the name implies, this type of load cell is configured as a washer so that it can be mounted by securing a bolt through the device.

Other compressive load cells which are less sensitive to off-axis loading are characterized by several types. One such load cell employs a shear web design disclosed in U.S. Pat. No. 5,461,933. This design consists of a pair of concentric rings joined by two or more web members. Transducer elements disposed on the webs provide compression and tension force measurements. Although this design reduces sensitivity to off-axis loads, the web assembly must be accurately machined to tight tolerances. In addition, the traducers must be carefully bonded to the walls of the webs in a symmetrical manner in order to ensure accuracy in the measurements.

A ball and socket assembly design serves to maintain the loading force along the principle axis and exactly centered on the load cell. Such a design is shown in Photo 2 in the article by Clegg entitled "Bonded Foil Strain Gauge Force Transducers", *Sensors*, October 1996, pp. 68–75. As can be seen from the photograph, the manufacture of such a device is can be quite expensive.

A shear beam load cell, such as the one disclosed in U.S. Pat. No. 5,220,971, can be also be used in tension and compression applications. The transducer elements are diagonally placed on a machined web in the center portion of the device and measure the shear force of the applied load. Such devices are expensive to machine and accurate measurements depend on consistently centered and axially constrained forces.

What is needed is an easy to manufacture load cell which can deliver accurate measurements and which is insensitive to off-axis loading. It is also desirous to construct a load cell which is compact in size.

SUMMARY OF THE INVENTION

The present invention is comprised of a helical coil of wire which serves to bear an axial load, either a compressive force or a tensile force. The helical coil includes two strain gage modules which detect the strain caused by the applied axial load. The strain gage modules are located on the coil in diametrically opposed relation.

Each strain gage module consists of a pair transducers, each transducer in turn consisting of a plurality of grid elements. The pair of transducers are positioned about a neutral axis of the coil in order to reject any bending moment perpendicular to that axis which is produced by an off-axis load. Each pair of transducers is arranged so that when one transducer is subjected to a compressive force, the other is experiences a tensile force. Both pairs of transducers are then coupled in a Wheatstone bridge arrangement so that bending moments in the plane of the neutral axis, due to off-axis loading, are rejected.

In one embodiment of the present invention, the transducers are positioned along the outside diameter of the coil. In another embodiment, the transducers are positioned along the insider diameter of the coil. In yet another embodiment, the transducers are positioned on an upper or a lower surface of the coil. In this embodiment, it is necessary that the coil never become fully compressed since doing so will result in crushing of the transducers. A compression stop member is provided to ensure that the coil does not fully compress.

In yet a fourth embodiment, a helical coil is outfitted with two pairs of strain gage modules. For each pair, the modules are located upon the helical coil in diametrically opposed relation. Moreover, each pair of modules is orthogonally positioned relative to the other pair.

One pair of modules is wired in an additive bridge circuit. The other pair is wired in a subtractive bridge circuit. This arrangement permits accurate load force measurement, while at the same time providing information relating to the location of the load force relative to the centerline of the coil.

BRIEF DESCRIPTION OF THE DRAWINGS

FIGS. 4A–4C are schematic diagrams of transducer bridge configurations.

FIGS. 5A–5C and 6–10B illustrate typical uses of a helical load cell constructed in accordance with the present invention.

BEST MODE OF CARRYING OUT THE INVENTION

Figure 1:
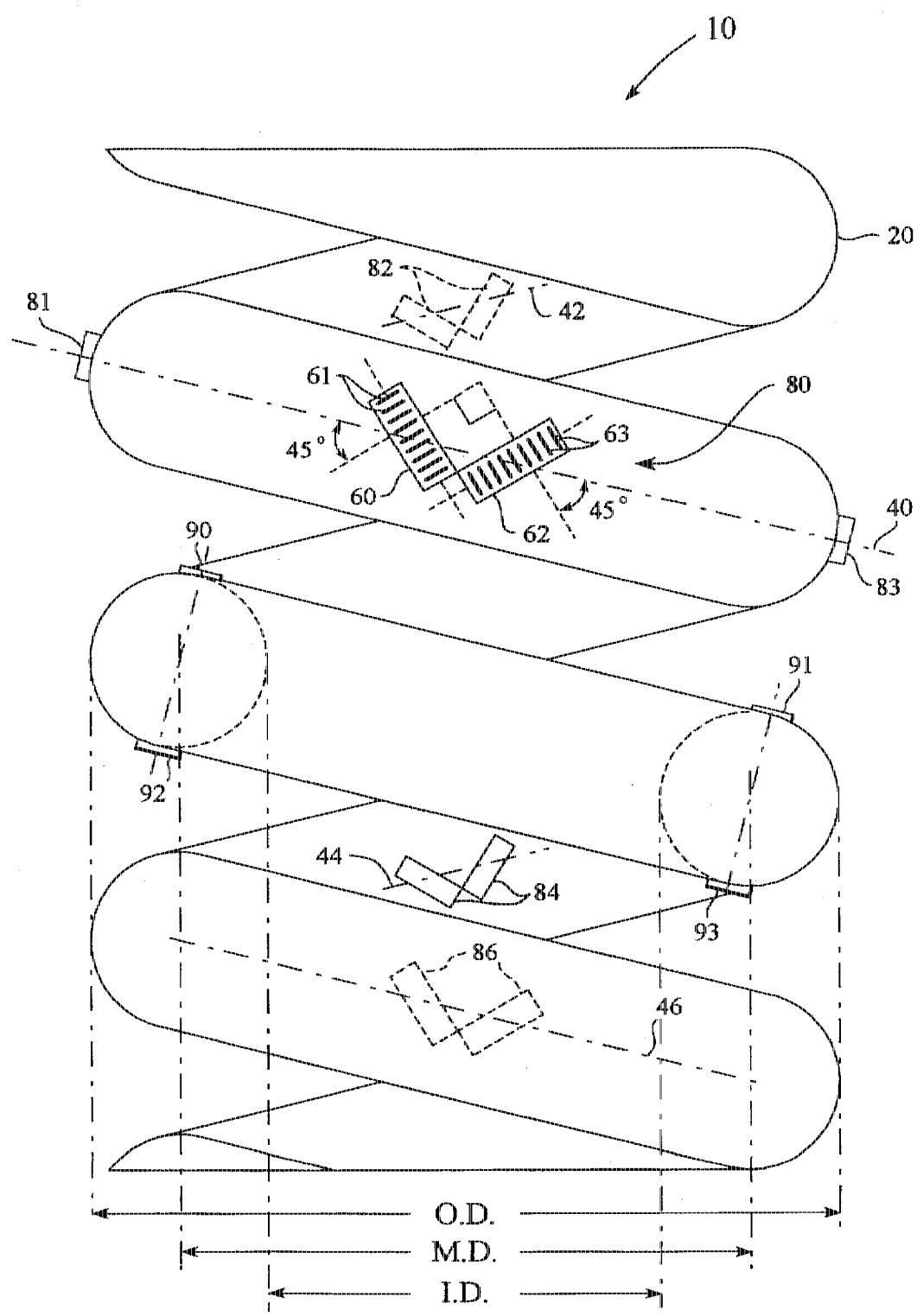
FIGS. 1 and 2A–2D show a load cell constructed in accordance with the invention, illustrating the various embodiments of the invention.

FIG. 1 shows the various embodiments of the helical load cell 10 in accordance with the present invention. A length of wire is wound to form a helical coil (a spring) 20. This is preferably done by drawing the wire through a die, resulting in a coil consisting of wire having a very consistent diameter along its length. Other techniques for forming springs are known in the art, however, and the specific method of forming the helical coil is not relevant to the practice of the present invention.

Figure 2A:
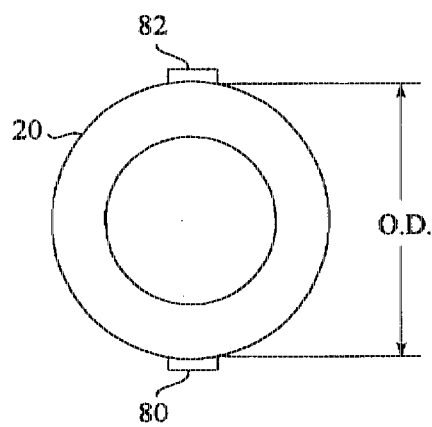

A first embodiment of the helical load cell 10 is shown with respect to strain gage modules 80, 82. Each module 80, 82 is mounted to the coil 20 along a neutral axis of the coil in a diametrically opposed relation to the other module. Strain gage module 80 is shown aligned relative to neutral axis 40, while strain gage module 82 is aligned with respect to neutral axis 42. In the first embodiment, the modules are positioned at an outside diameter of the helical coil 20. The module 82 is shown in phantom indicating that it is located at the outer periphery of the coil and opposite to module 80 along the diameter of the coil. FIG. 1 and the top view of FIG. 2A more clearly show this arrangement of strain gage modules 80, 82 along the outside diameter O.D. in accordance with the invention. This placement of the modules 80, 82 along the outer periphery of the coil facilitates manufacture of the invention.

Figure 2B:
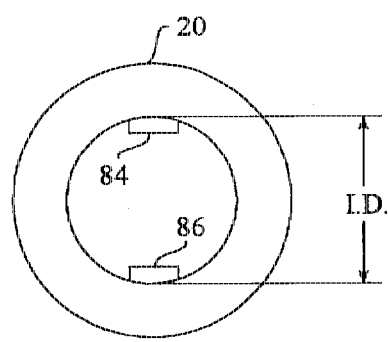

A second embodiment of the helical load cell 10 is also shown in FIG. 1 with respect to strain gage modules 84, 86. As in the first embodiment, each module is mounted to the coil 20 in diametrically opposed relation to the other module. Module 84 is aligned relative to a neutral axis 44 of the helical coil 20, and module 86 is aligned along neutral axis 46. In the second embodiment, however, the modules 84, 86 are mounted along the interior diameter of the coil. Thus, module 84 is shown in solid, indicating that it is positioned along the interior surface of the coil, while module 86 is shown in phantom, being disposed upon the inside periphery of the coil at a point opposite to module 84 along the coil's inside diameter. FIG. 1 and the top view of FIG. 2B more clearly illustrate the arrangement of strain gage modules 84, 86 along the inside diameter I.D. of the coil 20.

Figure 2C:
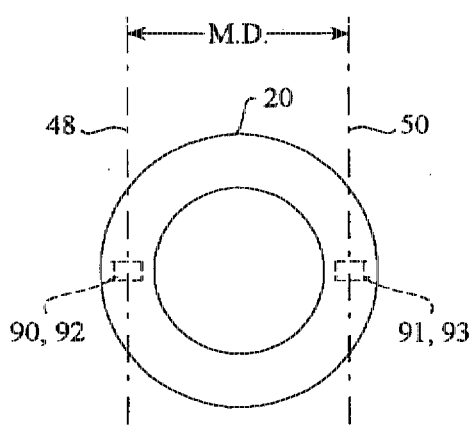

Whereas the first two embodiments of the present invention have the strain gage modules located either on the outside or inside periphery of the coil 20, a third embodiment, also shown in FIG. 1, shows the modules 90-93 are positioned either upon an upper surface of the helical coil 20 or upon a lower surface thereof. In the third embodiment, one of the strain gage modules 90, 92 is paired with one of the diametrically opposed strain gage modules 91, 93. It can be seen, therefore, that four variations of the third embodiment are possible. Thus, in one variation, the diametrically opposed modules both are located on a top surface of the coil, such as modules 90 and 91. In a second variation, the modules are positioned on a bottom surface of the helical coil 20, such as modules 92 and 93. In third and fourth variations, the diametrically opposed modules are located on opposite surfaces, such as modules 90 and 93, or modules 92 and 91. FIG. 2C shows these combinations of arrangements as seen from the top. The modules 90-93 are illustrated in phantom to indicate that they are disposed either on the upper or the lower surface of the coil 20. FIG. 1 and FIG. 2C also show that the modules 90-93 are aligned relative to their respective neutral axes 48, 50, and in diametrically opposed relation along a mean diameter M.D. of the coil.

Figure 2D:
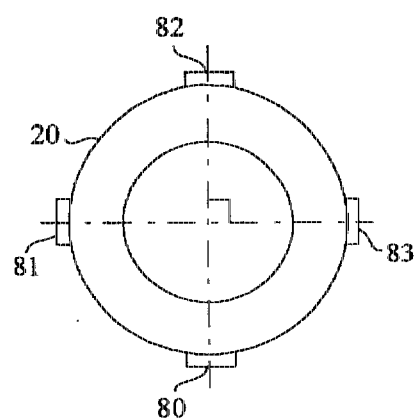

FIG. 1 illustrates yet a fourth embodiment of the invention. As will be explained below, the fourth embodiment of the load cell is capable of providing information as to the location of the applied force of an off-axis load, in addition to sensing the magnitude of that load without sensitivity to its position. Turning then to FIG. 1, strain gage modules 80-83 are arranged as shown in accordance with the fourth embodiment. Strain gage modules 80, 82 are shown in diametrically opposed relation, as are strain gage modules 81, 83. In addition, the module pair 80/82 is shown orthogonally positioned relative to the module pair 81/83, although this is not necessary. The top view of FIG. 2D more clearly shows the arrangement of the strain gage modules 80-83 in accordance with the fourth embodiment.

Referring once again to FIG. 1, additional detail of the strain gage modules used in each of the three above-described embodiments will be discussed. Consider the strain gage module 80. As can be seen, the module 80 consists of a first transducer 60 and a second transducer 62, shown in the figure in enlarged format for clarity. Each of the transducers 60, 62 consists of a plurality of grid elements 61, 63, respectively. The grid elements are the active portion of a transducer, the resistance of which changes with an applied force. Transducer technology is a well understood art so that operation of the transducers requires no further discussion in connection to the practice of the invention.

The first transducer 60 is positioned on the helical coil 20 symmetrically about the neutral axis 40. That is, as much of the transducer 60 lies above the neutral axis 40 as does below the neutral axis. In addition, the transducer 60 is oriented so that its grid elements 61 lie at substantially forty-five degrees relative to the neutral axis. The second transducer 62 also is positioned symmetrically about the neutral axis of the helical coil 20 and proximate the first transducer. The second transducer is oriented so that its grid elements 63 lie at a forty-five degree angle relative to the axis 40 and at a ninety degree angle relative to the grid elements 61 of the first transducer 60, as shown in FIG. 1.

Each of the strain gage modules 80-93 are constructed in a manner similar to strain gage module 80. Each module consists of two transducers aligned to their respective neutral axes and to each other as shown for module 80.

The transducers which comprise the strain gage modules of the invention may be mounted simply by gluing them to the surface of the helical coil 20 with an appropriate glue such as an epoxy compound. Alternatively, thin film transducers may be used, which are sputtered onto the surface of the coil. This method lends itself to high volume automated processes. Another type of transducer involves silicon transducers bonded to the coil. In this process, the transducers are fabricated out of silicon in wafer form, not unlike the fabrication of silicon integrated circuits. The silicon chip transducer is then bonded to the metal surface of the coil and wires are attached by wire bonding techniques similar to those used in integrated circuit manufacture. Silicon transducers are on the order of fifty times more sensitive than their metal-based counterparts. The gage factor of a transducer is defined as the ratio of the change in its resistance to the change in its length, multiplied by $1 \times 10^6$. For metal transducers, the gage factor is typically 2, while the gage factor for a typical silicon transducer is 100.

It is clear that any one of a number of types of transducers can be used, and any of a number of methods for mounting the devices to a coil are known. The particular device type and mounting method are dictated largely by desired performance characteristics and manufacturing costs. It is noted, therefore, that the specific type of transducer and the mounting method is not relevant to the practice of the present invention.

When attaching the transducers to the coil, the coil (spring) first is fully compressed to a solid cylinder. This pre-stresses the coil, changing the yield point so that the new yield point of the material is reached only when the coil is fully compressed. Thus, transducers mounted to the coil will not be damaged when the coil becomes fully compressed, since the material of the coil will not exceed its yield point. The transducers are mounted after the coil is pre-stressed and allowed to return to its uncoiled state. Alternatively, the transducers may be mounted to the coils when the coils are in the fully compressed condition. For larger coils, however, the machinery used to fully compress such coils makes it impractical to mount the transducers. Thus, the former method is preferred.

Compressing the coil to a solid cylinder results in a load cell that no longer measures, but is rigid and quite strong; as strong as a true cylinder with the same cross sectional area. As an example, a load cell rated at 5,000 pounds can be made from 0.625 inch diameter wire wound to a two inch diameter coil. The coil reaches a solid at about 10,000 pounds of axial force. No further measurement is possible, but the load cell is then able to withstand additional load to approximately 100,000 pounds without any damage to the transducers disposed on the coil. This is due to the fact that the yield point of the metal comprising the grid elements of the transducers, in μin/in of strain, is nearly the same as that of the material in the coil, and preloading to the solid condition assures that the strain cannot subsequently be exceeded. Prior art load cells only allow two to three times the rated load force before permanent damage occurs. A helical load cell manufactured in accordance with the present invention allows up to twenty times overload without any damage. The stops are built-in and are effectively present when the spring has been compressed to a solid.

Figure 3:
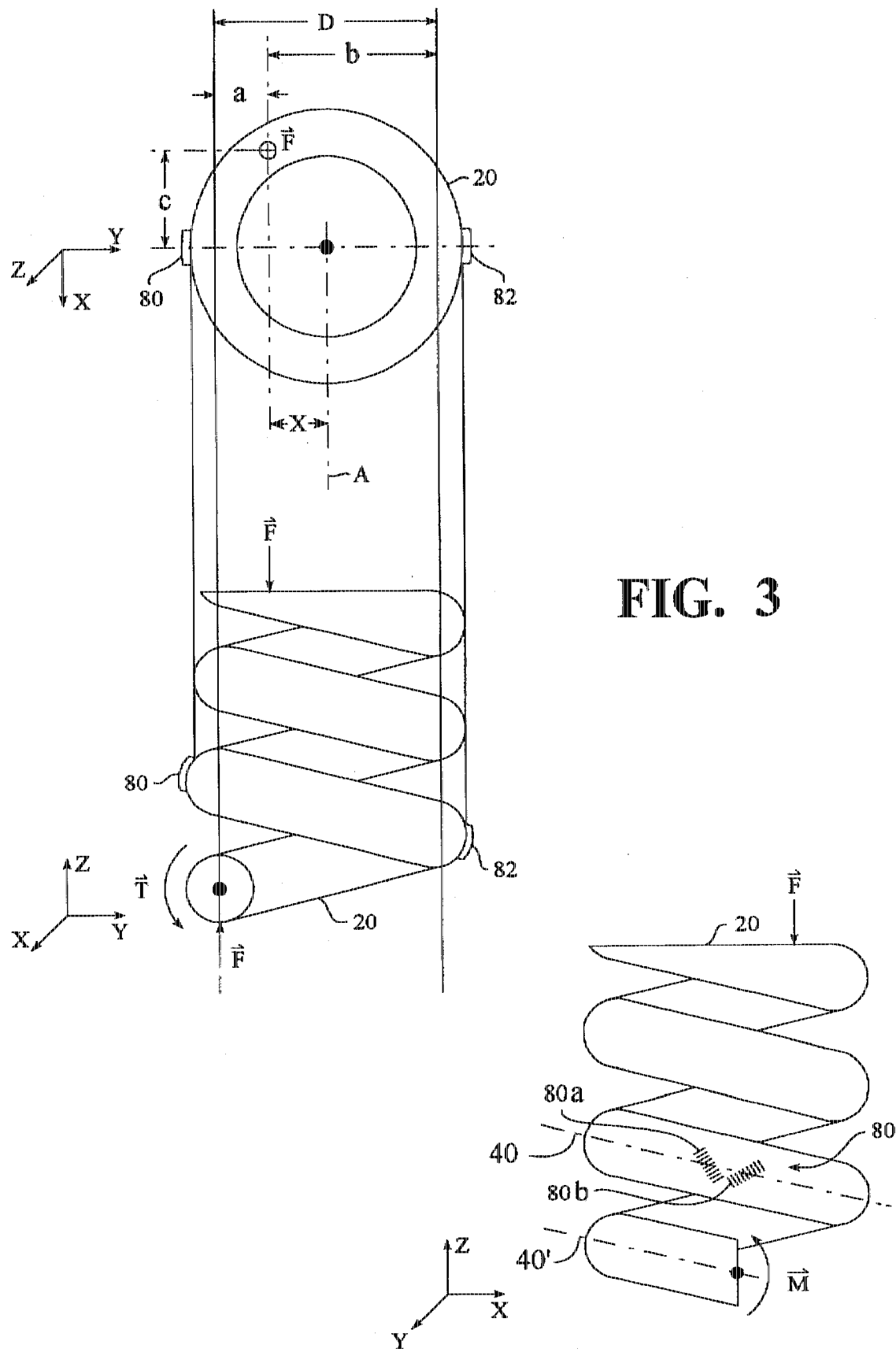
FIG. 3 is a force diagram illustrating the force vectors acting on a helical coil when an off-axis load is applied.

FIG. 3 shows the forces experienced by the helical coil 20 due to a load F applied at an arbitrary off-center position. Consider first, the special case wherein the loading force is applied along the central axis of the coil 20. The maximum shear stress $\tau_{max}$ experienced along the outside diameter of the coil is:

$$\tau_{max} = \frac{F}{A} - \frac{Tr}{J} \quad (1)$$

where:

$\tau_{max}$ is the maximum shear force at the outside diameter surface of the coil, F is the applied force, A is the cross sectional area of the coil T is the resisting torsional force, r is the radius of the wire comprising the coil, and J is the polar area moment of inertia of the wire.

The maximum shear force experienced along the inside diameter of the coil is:

$$\tau_{max} = \frac{F}{A} + \frac{Tr}{J} \quad (2)$$

where the terms are as defined above.

Since the applied force is at the center of the coil, the torsional force, T, is equal to F×D/2, where D is the mean diameter of the coil.

In the generalized case, however, the applied force may be arbitrarily located, such as shown in FIG. 3. In this case, the torsion term $$\frac{T \times r}{J}$$

varies depending upon the location of the applied force on the coil, and thus the shear stress τ will vary. Consider the arrangement in FIG. 3. Strain gage modules 80, 82 are positioned along the outside diameter of the helical coil 20. A loading force F is applied off-axis relative to the coil, at a-units left of center along the Y-axis and c-units off center along the X-axis.

Since the loading force is applied off-axis, a bending moment M about the Y-axis is created, as shown in FIG. 3. Recall from the above discussion, however, that each transducer 80a, 80b of the strain gage module 80 is symmetrically aligned along a neutral axis 40 of the coil. By so doing, one half of the active grid elements are located above the axis, and the other half of the grid elements are below the axis. A bending moment M, as shown in FIG. 3 applies tension force on the elements below the axis and a compressive force on the elements above the axis. The resistance changes experienced by the grid elements above and below the axis are equal and opposite, and thus the total resistance change experienced by the entire transducer due to the bending moment M is substantially equal to zero. Therefore, the maximum shear equation needs not account for the bending moment due to an off-axis load, since the strain gage modules are not sensitive to such a force.

Continuing with FIG. 3 then, the shear force $\tau_{80}$ experienced by strain gage module 80 is:

$$\tau_{80} = \frac{F}{A} - \frac{Tr}{J} \quad (3)$$

$$= \frac{F}{A} - (Fa)\frac{r}{J}$$

where the torsion force T is F×a.

Similarly, the shear force $\tau_{82}$ experienced by the diametrically opposed strain gage module 82 is:

$$\tau_{82} = \frac{F}{A} - \frac{Tr}{J} \quad (4)$$

$$= \frac{F}{A} - (Fb)\frac{r}{J}$$

where the torsion force T is F×b.

If the outputs of the two strain gage modules are summed, then:

$$\tau_{TOTAL} = \tau_{80} + \tau_{82} \quad (5)$$

$$= \frac{2F}{A} - \frac{Fr}{J}(a+b)$$

Since (a+b) is equal to the mean diameter D of the coil 20, then:

$$\tau_{TOTAL} = \frac{2F}{A} - \frac{FrD}{J} \quad (6)$$

$$= \left(\frac{2}{A} - \frac{rD}{J}\right)F$$

$$= kF$$

Thus, the total shear $\tau_{TOTAL}$ measured by the two diametrically opposed, outside diameter strain gages 80, 82 is directly proportional to the loading force F, where the constant of proportionality k is:

$$k = \left(\frac{2}{A} - \frac{rD}{J}\right) \quad (7)$$

Since the proportionality constant k consists only of the physical parameters of the coil, the total shear $\tau_{TOTAL}$ is completely independent of the position of the load. Thus, loading anywhere along the top surface of the coil produces the same $\tau_{TOTAL}$. Moreover, a loading force applied outside the diameter of the coil will result in the same $\tau_{TOTAL}$ irrespective of the location of the load. This can be shown by a similar analytical treatment of the applied load and the forces resulting therefrom.

Recall from Eq. (2) that the inside shear is computed by the addition of the force terms, resulting in a greater range of measurable shear force. Because of the increased dynamic range, the inside diameter strain gage modules 84, 86 shown in FIG. 1 are more sensitive to loading forces than are the outside diameter mounted modules. However, placement of transducers along the inside periphery of the coil is more difficult to achieve and in some applications may subject the transducers to risk of damage, as will be explained below. Nonetheless, inside diameter modules may be applicable under certain conditions and certainly fall within the scope of embodiments contemplated for the present invention.

It is further noted, in connection with the embodiments of the invention involving the surface mounted strain gages 90–93 shown in FIG. 1, that the transducers thereof are not subject to the direct shear component, namely F/A, leaving only the torsional shear to F be measured. A shortcoming of this embodiment of the invention, applicable to all four variations, is that positioning of the transducers on the upper or lower surface of the coil subjects them to damage when the coil is fully compressed to a solid, i.e. with no gaps between the wires.

Referring again to FIG. 3 and to Eqs. 3 and 4, if the difference between the measured shear forces $\tau_{80}$ and $\tau_{82}$ is computed, then:

$$\begin{aligned} \tau_{DIFF} &= \tau_{80} - \tau_{82} \quad (8) \\ &= -(Fa)\frac{r}{J} + (Fb)\frac{r}{J} \\ &= \frac{Fr}{J}(b-a), (b-a) = 2x \\ &= k_1 Fr, \; k_1 = \frac{2r}{J} \end{aligned}$$

Thus, the difference $\tau_{DIFF}$ reflects the distance x from the centerline A of the coil 20 to the applied load force.

As shown in FIG. 3, the distance x measured by the strain gage modules 80, 82 is the distance between the centerline of the coil and a line which is perpendicular to the line between the modules and which passes through the applied force F. It can be seen from Eqs. 6 and 8, therefore, that a helical load coil can be constructed which is both insensitive to off-axis loads and capable of providing information as to the location of such loads with respect to the distance from the centerline of the coil.

Returning to FIG. 1 then, such a configuration is shown with respect to strain gages 80–83. As will be explained below, strain gages 80 and 82 which provide force measurements that are independent of the location of the load are coupled in a conventional bridge configuration. Strain gages 81 and 83 are coupled in a modified bridge circuit to provide a signal that is a function of the distance of the loading force from the centerline of the coil.

Figure 4A:
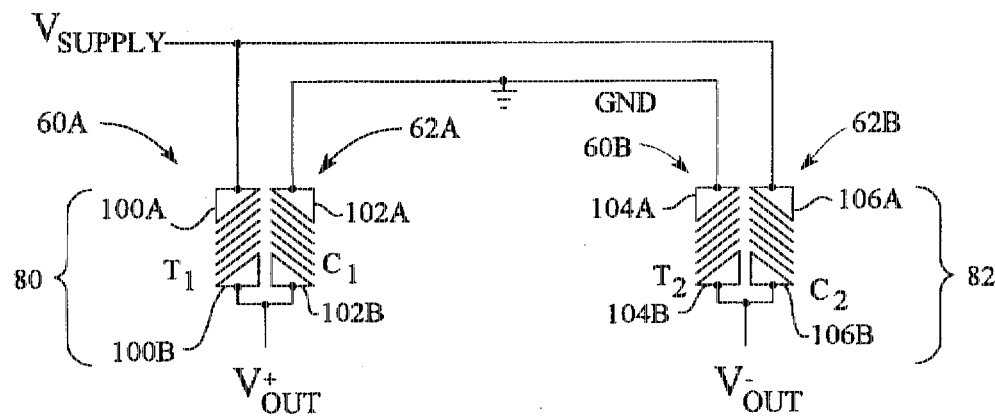
Figure 4A:
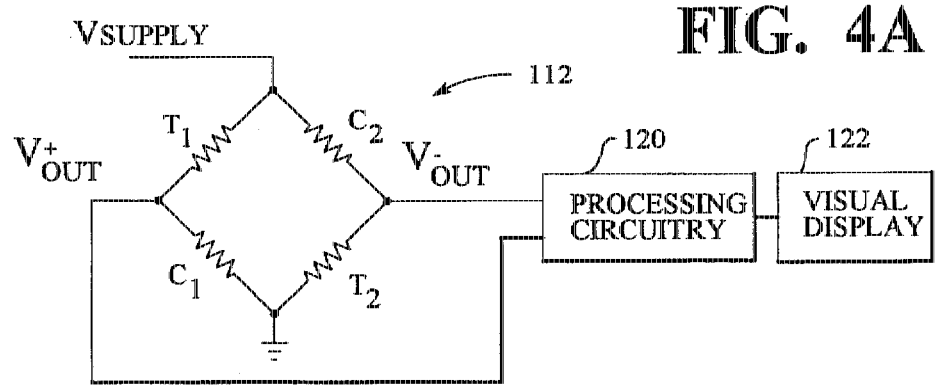
Figure 4B:
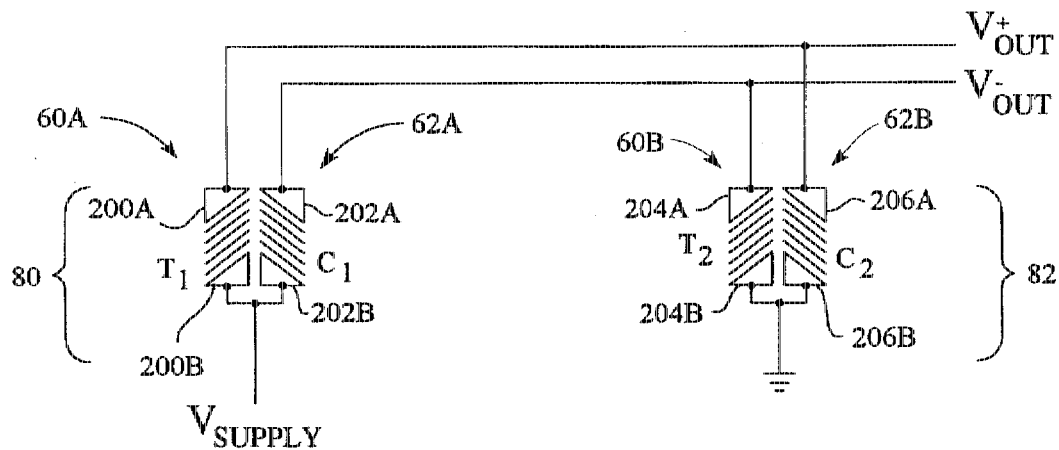
Figure 4B:
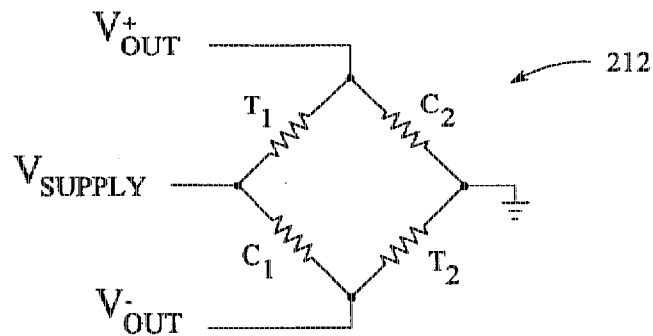

Turning now to FIGS. 4A–4C, the bridge circuits used to connect the strain gage modules will now be described. Although the figures are illustrated using the outside diameter-mounted strain gage modules 80, 82, the same bridge circuitry is applicable to the second and third embodiments, namely the inside diameter-mounted modules 84, 86 and the top/bottom surface-mounted modules 90–93, all as shown in FIG. 1.

Referring to the strain gage modules 80, 82 shown in FIG. 4A, recall that the transducers in each of the transducer pairs 60A/62A and 60B/62B, respectively comprising the two modules, are orthogonally oriented relative to each other. As such, when one transducer, say 60A, is subject to a compressive force the other transducer, 62A is subject to an equal and opposite tensile force. This is represented in FIGS. 4A and 4B by the T and C reference letters. The particular transducers which are in tension, however, will depend upon whether the coil is in tension or compression and whether the coil has been wound in a right or left hand sense.

FIG. 4A shows a first bridge circuit arrangement wherein the oppositely stressed transducers of each of the modules are coupled together. Thus, an end 100A and 106A of each of transducers 60A and 62B are coupled together and in turn coupled to a voltage supply, and an end 102A and 104A of each of transducers 62A and 60B are coupled together and in turn coupled to ground. The remaining ends 100B, 102B of transducers 60A, 62A are coupled together and serve as a $V^+_{out}$ output reference. Similarly, two ends 104B, 106B of transducers 60B, 62B are coupled together and serve as a $V^-_{out}$ output reference. The circuit diagram 112 of FIG. 4A shows that the interconnections form a traditional Wheatstone bridge, where the resistive elements represent the transducers 60A–62B.

FIG. 4B shows a second bridge circuit arrangement. The interconnections among the transducers 60A–62B are identical to those shown in FIG. 4A. However, the voltage supply and ground connections are interchanged with the $V^+_{out}$ and $V^-_{out}$ connections. The accompanying circuit diagram 212 illustrates the resulting bridge circuit.

In both of the above bridge circuits 112, 212, similarly stressed transducers are coupled as opposing arms of the bridge; thus, the $T_1$ and $T_2$ transducers are on opposite arms of the bridge, as are the $C_1$ and $C_2$ transducers. The circuits 112, 212 are common bridge configurations for effectively summing together the transducer outputs. These circuits therefore each produces a signal indicative of the sum of the detected shear forces in accordance with Eq. 6.

The bridge outputs $V^+_{out}$, $V^-_{out}$ are fed into processing circuitry 120. In the preferred embodiment, the processing circuitry is a differential amplifier wherein its differential inputs receive the bridge outputs. The output of the differential amplifier can then be digitized to drive a visual display 122 to provide a digital readout.

Turn now to FIG. 4C for a description of a bridge circuit used in the fourth embodiment of the present invention. Recall that this embodiment involves the use of four strain gage modules 80–83 arranged on the helical coil as illustrated in FIG. 1. Strain gage modules 80, 82 are coupled in an additive manner utilizing a conventional bridge circuit, such as those shown in FIGS. 4A and 4B. Strain gage modules 81, 83, however, are coupled in a modified bridge circuit.

Such a circuit is shown in FIG. 4C. The similarly stressed transducers 60A, 60B of the respective modules 81, 83 are coupled together and provide $V^+_{out}$, as are transducers 62A, 62B which provide $V^-_{out}$. In addition, terminals 300B, 302B of transducers 60A, 62A are coupled to $V_{supply}$, while terminals 304B, 306B of transducers 60B, 62B are coupled to ground. The equivalent circuit is shown by circuit diagram 312.

It can be seen that the similarly stressed transducers of each module 81, 83 are coupled as adjacent arms of the bridge; thus $T_1$ and $T_2$ form adjacent arms, and $C_1$ and $C_2$ form adjacent arms. In this circuit arrangement, the transducer outputs are combined in a subtractive manner.

A peculiar aspect of the subtractive bridge circuit 312 is that it does not sense the presence of on-axis loads. In the presence of an on-axis load, the strain gage modules 81, 83 are subject to the same loading force; thus $T_1$ and $T_2$ will change by the same amount, and $C_1$ and $C_2$ will change by the same amount. The differential output $V^+_{out}$, $V^-_{out}$ will therefore remain unchanged. Thus, if the circuit is nullbalanced when there is no load, i.e. the differential output is zero volts, the circuit will remain balanced in the presence of an on-axis load. This is consistent with Eq. 8 (and FIG. 3) where x=0 for an on-axis load.

Thus, a helical load cell constructed in accordance with the above-described fourth embodiment, provides: (1) a signal proportional to the loading force F, irrespective of its location, produced by strain gage modules 80, 82; and (2) a signal proportional to the loading force times the distance of the force from the centerline of the coil, produced by strain gage modules 81, 83. Eqs. 6 and 8 show that these two signals are readily combined to derive the location x of an off-axis load, while at the same time providing an accurate measurement of the load irrespective of its location.

A few additional observations are provided in connection with the subtractively coupled strain gages; e.g. 81, 83 shown in FIG. 1. First, although FIG. 1 shows the second pair of strain gage modules 81, 83 to be mounted in a fashion as to be perpendicular to the first pair of strain gage modules, this is not necessary. As already noted above, the second pair of modules may be positioned at any angle relative to the first pair of modules.

Second, FIG. 1 shows the second pair of modules 81, 83 to be mounted along the outside diameter O.D. of the coil 20. It is noted that the modules may be mounted along the inside diameter I.D. of the coil as well. The operation of the invention is unaffected whether both pairs of strain gages are mounted along the outside diameter, along the inside diameter, or whether one pair is mounted on the outside diameter and the other pair is mounted on the inside diameter.

Third, it is observed that another pair of strain gage modules (not shown) can be utilized in a subtractive manner to obtain the location of the center of gravity of the applied load. Recall that a subtractively coupled pair of modules, such as modules 81, 83, provides a force measurement that is a function of the distance between the centerline of the coil and a line which is perpendicular to the line between the modules and which passes through the applied force (see FIG. 3). Thus, if two pairs of strain gage modules are mounted to the coil, each pair arranged orthogonal to the other pair and each pair coupled as a subtractive bridge circuit, then X and Y locations (of a plane defined by the two pairs of strain gage modules) of the center of gravity of the applied load can be computed and the location of the center of gravity determined.

Various applications of a helical load cell constructed in accordance with the present invention will now be described with reference to FIGS. 5A–5C and 6–10. FIG. 5A shows a load bearing platform 302 having a rod 304 coupled thereto which slidably fits into a tube member 306 anchored to a base member 308. The rod and tube portions fit through the center of a helical coil 20 which supports the platform 302. In this configuration, the strain gage modules 80, 82 are located along the periphery of the outside diameter of the coil, since the inside diameter-mounted strain gages would likely be crushed between the inside periphery of the coil and the rod 304. FIG. 5B shows a configuration which permits the use of inside diameter strain gage modules 84, 86. In this configuration, the platform 302 includes an inner tube member 310 into which the coil 20 fits. The inner tube 310 slidably fits into an outer tube member 312 which is anchored to the base 308.

The configurations of FIGS. 5A and 5B are also adaptable to the surface mounted embodiments of the helical load cell, where the transducers are located on the upper and/or lower surfaces of the coil 20 (see FIG. 1). The length(s) of the rod 302 and/or tube members 306, 310, 312 can be extended so that the coil cannot reach a fully compressed condition. In this way, the surface mounted transducers will avoid being crushed by a compressive load which would fully compress the coil.

FIG. 5C shows the use of linear ball bearings 314 placed in the tube 306 to provide lateral support in high side loading applications. The linear ball bearings serve to minimize frictional forces between the rod 304 and the tube 306. In this case, the vertical force component $F_v$ is measured, while the horizontal force component $F_h$ is absorbed by the bearings. An application for such a high side-force load is in the construction of a hydraulic clamp used for lifting an object whose weight needs to be measured. An example would be a garbage container clamp where the horizontal clamping force which grips the container can be separated from the weight of the container.

Figure 6:
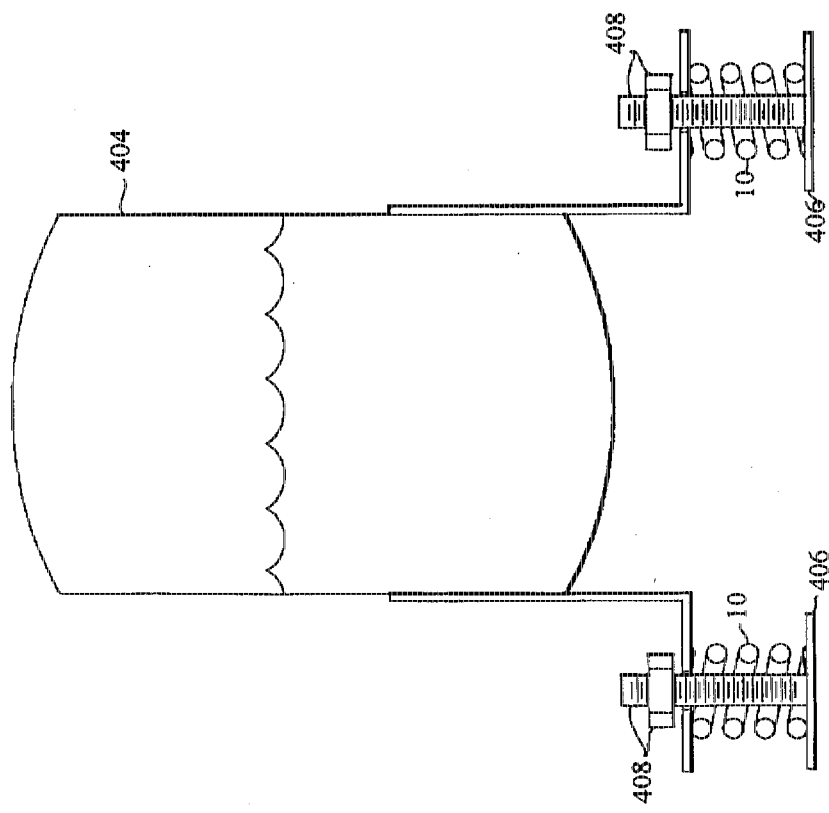

Turn now to FIG. 6 for another use of the helical load cell 10 of the invention. In chemical processing situations, corrosive chemicals sometimes need to be transported, stored and utilized. This is particularly true in the manufacture of semiconductor integrated circuits. One chemical utilized in this field is hydrofluoric acid HF used for etching semiconductor wafers. HF is highly reactive and is used hot. The tanks and tubing used to fill and drain them are usually made of Teflon or other nonreactive material, since any reactive substances will corrode, fail, and contaminate the acid. Commercially available level sensors exist which are used within the tank to monitor the level. However, such sensors are quite expensive. The helical load cell of the present invention provides a viable alternative to such sensors.

As can be seen in FIG. 6, a chemical tank 402 having mounting brackets 404 is supported by helical load cells 10 upon a base 406 and held in place by retaining nuts and bolts 408. The weight of the tank and its contents are then easily determined by monitoring the output of the load cells 10. Since the helical load cells are insensitive to loading conditions, existing chemical tanks can easily be re-fitted without expensive modifications.

Figure 7:
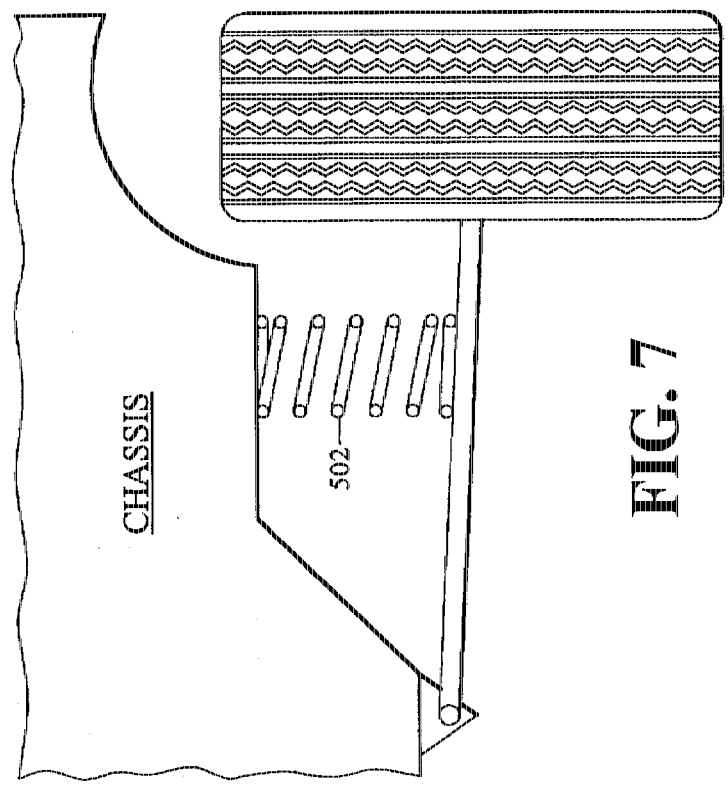

Refer to FIG. 7 for another application of the present invention. Many vehicles have suspension systems which utilize a coiled spring as opposed to leaf springs. FIG. 7 shows that such coil springs 502 can be readily converted to a helical load cell by placing transducers on them in accordance with the present invention. This is especially useful in the case of race cars having suspensions consisting of wound helical springs at all four wheels. Converting such springs to helical load cells allows real-time measurements to be taken by an on-board data acquisition system, allowing the race team mechanics to optimize the car's handling characteristics.

Figure 8A:
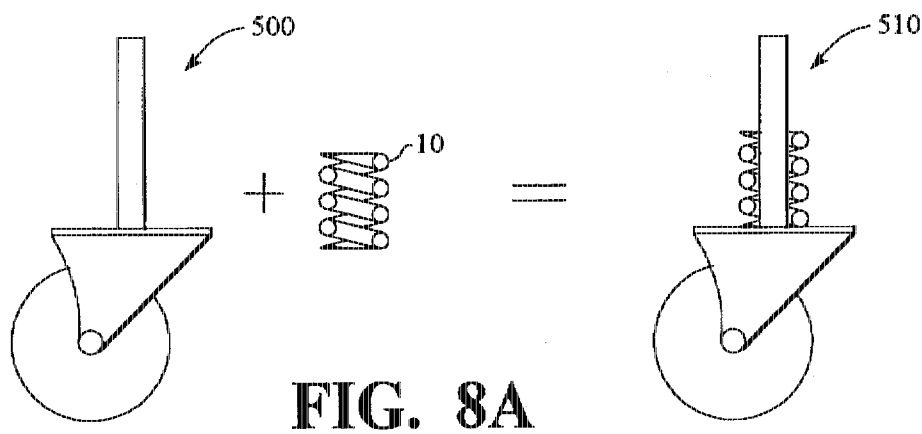
Figure 8B:
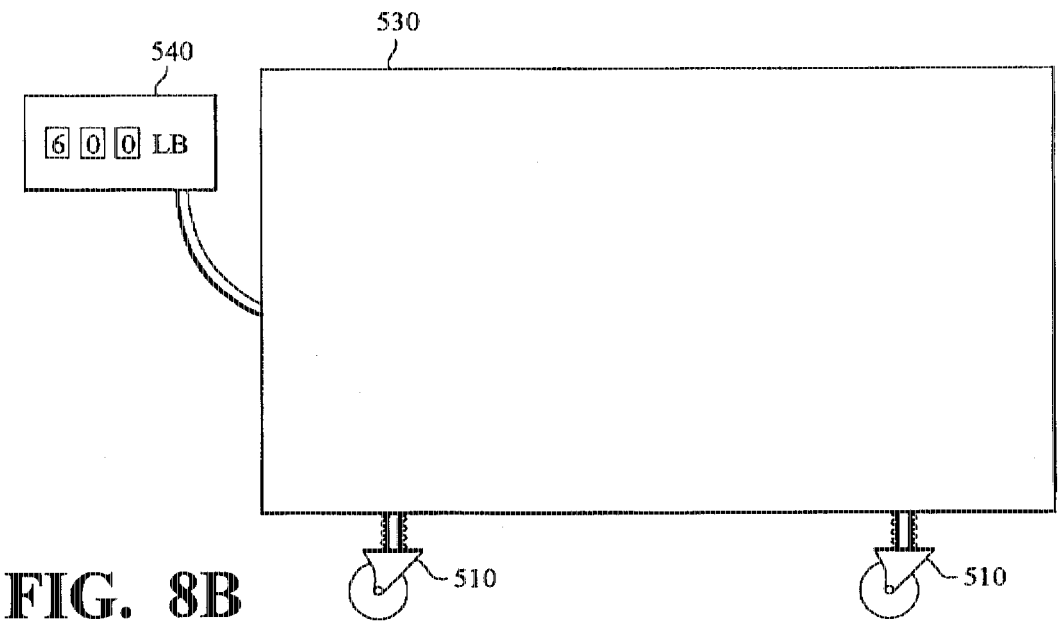

FIG. 8 shows yet another application of a helical load cell 10. Stem casters 500 are wheels which can be added to any container to make that container portable. FIG. 8 shows that a helical load cell 10 can be easily added to a caster and the combination 510 placed on a dumpster 530, for example. The addition of a digital readout device 540 effectively and inexpensively converts that dumpster to a scale. This is especially useful for dumpsters which hold recyclable materials. The scale can be used to weigh each load placed in the dumpster for the purpose of paying the contributor.

Figure 9:
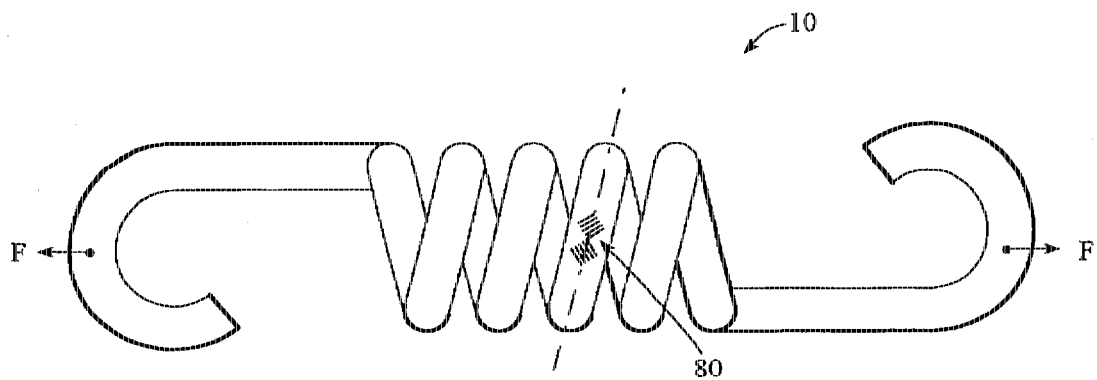

FIG. 9 shows that a helical load cell 10 can operate in tension as well as measure compressive loads. The transducers 60, 62 which comprise each of the strain gage modules 80, 82 behave in the same manner under tensile loads as under compressive loads.

FIG. 10A shows an application of the helical load cell in connection with automobile seats. Considerable attention is being devoted to the development of airbag systems for automobiles which are inherently safer than current systems.

A problem that has been identified is that the explosive force of deployment required to safely arrest the motion of a large adult may not be appropriate for adults of diminutive stature or children. Much discussion has centered around the creation of "smart" airbag systems that would moderate or inhibit airbag deployment based on the weight of the occupant of the vehicle seat protected by the airbag. Currently, no suitable technology exists to accurately measure the seat occupant's weight at a reasonable cost.

FIGS. 10A and 10B show a low cost weight sensor for a vehicle seat utilizing the helical load cell of the present invention. The system 600 is compatible with the form factor and adjustment parameters of standard auto seats. A helical load cell 10 is placed between a base plate or frame 604 of the seat and a seat plate 602 which holds a foam pad 606. The helical load cell 10 replaces a sheet metal framework which is used in current seat systems to couple the plate 602 to the base 604. The base is free to move on rollers 608 to permit adjustment of the seat. The load cell 10 is oriented so that the axis of the coil portion 20 is vertical, thus measuring only vertical forces and not horizontal forces. The entire assembly is then covered in fabric.

Since the helical load cell is capable of measuring the total downward force present on the seat plate, regardless of the manner or load distribution of that weight, the occupant size and seating orientation has no affect on the measured weight. Deflection of the seat under load, and the compliance of the seat to forces away from the center of the spring may be adjusted by the thickness of the wire, the diameter of the coil, and the total number of turns in the load cell. For example, a coil made from 5/8 inch diameter wire wound to a diameter of two inches results in a load cell which deflects about 0.05 inches when impressed with a 200 pound force. With two active turns of the wire, this coil also appears to have sufficient stiffness so as not to have excessive compliance when the seat is loaded off-center, such as when the occupant is sitting on the front edge of the seat.

Another embodiment of the automobile seat incorporates a helical load cell 20 having an arrangement of four strain gage modules, such as the arrangement of modules 80-83 shown in FIG. 1. The top view of FIG. 10B shows the orientation of the strain gage modules. The modules 80, 82 are arranged laterally, facing the side doors of the automobile. These strain gage modules are coupled in an additive type of bridge circuit, such as those shown in FIGS. 4A and 4B. These modules provide a measure of the weight of the seat occupant, independently of how the occupant is seated.

The modules 81, 83 are arranged front to rear, and are coupled in a subtractive type of bridge, such as shown in FIG. 4C. These modules provide a signal that is combined with the signal provided by modules 80, 82 to give a measure of how far forward or rearward the occupant is seated relative to the central axis A of the helical load cell 20.

This is an especially useful aspect of the helical load cell as used in an automobile seat. Airbag safety systems can be greatly enhanced to provide additional safety in connection with children's car seats. An automobile seat enhanced with a helical load cell in accordance with the fourth embodiment of the invention can detect whether the child's car seat is facing forward or rearward. At the same time, an accurate measurement of the weight of the child and the child's car seat is provided, even though the car seat and child are not centered over the central axis of the helical load coil; i.e. the child and the seat represent an off-axis load to the load coil.

I claim:

1. A load cell for detecting compressive and tensile loads comprising:
   a helical coil; and
   first and second strain gage modules disposed in diametrically opposite locations upon said helical coil;
   each of said strain gage modules having a first transducer element oriented substantially at forty-five degrees relative to a neutral axis of said helical coil and further having a second transducer element disposed proximate said first transducer element and oriented substantially at ninety degrees relative to said first transducer element.

2. The load cell of claim 1 wherein each of said transducer elements is disposed symmetrically about said neutral axis.

3. The load cell of claim 1 wherein said first and second strain gage modules are disposed along either an outside diameter of said helical coil or an inside diameter of said helical coil.

4. The load cell of claim 1 wherein said first and second strain gage modules are disposed upon an upper surface or a lower surface of said helical coil.

5. The load cell of claim 4 further including a stop member to prevent said helical coil from reaching full compression under a compressive load.

6. The load cell of claim 1 wherein said first and second strain gage modules are connected in a bridge circuit arrangement.

7. The load cell of claim 1 wherein said first and second transducers of each of said first and second strain gages are silicon gages.

8. The load cell of claim 1 further including third and fourth strain gage modules disposed in diametrically opposed locations upon said helical coil.

9. The load cell of claim 8 wherein said first and second strain gage modules are connected in an additive bridge circuit arrangement and said third and fourth strain gage modules are connected in a subtractive bridge circuit arrangement.

10. A helical load cell comprising:
    a helical coil for receiving a compressive or a tensile load;
    a first pair of transducers, each of said first transducers having a plurality of grid elements; and
    a second pair of transducers, each of said second transducers having a plurality of grid elements;
    each pair of said transducers mounted along a neutral axis of said helical coil and in diametrically opposed relation to the other pair;
    each of said transducers mounted symmetrically about said neutral axis such that said grid elements thereof are oriented substantially forty-five degrees relative said neutral axis;
    said transducers connected in a bridge circuit arrangement.

11. The helical load cell of claim 10 wherein said first and second pair of transducers both are disposed either upon an outside diameter of said helical coil or upon an inside diameter of said helical coil.

12. The helical load cell of claim 10 wherein each pair of said transducers is disposed either upon an upper surface or a lower surface of said helical coil.

13. The helical load cell of claim 12 further including a compression stop member to prevent said helical coil from becoming fully compressed.

14. The helical load cell of claim 10 further including a voltage supply terminal, a ground terminal, and first and second measurement terminals; wherein a first end of each of said first pair of transducers is coupled to said first measurement terminal, a first end of each of said second pair of transducers is coupled to said second measurement terminal, a second end of one of each of said first and second pairs of transducers is coupled to said ground terminal, and a second end of the other of each of said first and second pairs of transducers is coupled to said voltage supply terminal.

15. The helical load cell of claim 10 further including a voltage supply terminal, a ground terminal, and first and second measurement terminals; wherein a first end of each of said first pair of transducers is coupled to said voltage supply terminal, a first end of each of said second pair of transducers is coupled to said ground terminal, a second end of one of each of said first and second pairs of transducers is coupled to said first measurement terminal, and a second end of the other of each of said first and second pairs of transducers is coupled to said second measurement terminal.

16. The helical load cell of claim 10 further including a third and a fourth pair of transducers mounted to said helical coil, a voltage supply terminal, a ground terminal, and first and second measurement terminals; said third pair being diametrically opposite said fourth pair; said third and fourth pairs of transducers being coupled in a subtractive bridge circuit, wherein a first end of said third pair of transducers is coupled to said voltage supply terminal, a first end of each of said fourth pair of transducers is coupled to said ground terminal, a second end of one of each of said third and fourth pairs of transducers is coupled to said first measurement terminal, and a second end of the other of each of said third and fourth pairs of transducers is coupled to said second measurement terminal.

17. A method of manufacturing a load cell comprising the steps of:

winding a length of wire to form a helical coil;

mounting a first transducer along a first neutral axis of said helical coil;

mounting a second transducer along said first neutral axis and adjacent to said first transducer;

mounting a third transducer along a second neutral axis of said helical coil and diametrically opposite said first and second transducers;

mounting a fourth transducer along said second neutral axis and adjacent to said third transducer; and coupling said transducers in a bridge circuit arrangement;

each of said transducers having a plurality of parallel grid elements;

each of said steps of mounting including (i) aligning said transducers symmetrically about said first or second neutral axis and (ii) aligning said grid elements at a substantially forty-five degree angle relative to said first or second neutral axis.

18. The method of claim 17 wherein said step of mounting said second transducer further includes aligning said grid elements thereof at substantially ninety degrees relative to said grid elements of said first transducer, and said step of mounting said fourth transducer further includes aligning said grid elements thereof at substantially ninety degrees relative to said grid elements of said third transducer.

19. The method of claim 17 further including fully compressing said helical coil prior to said steps of mounting said transducers.

20. The method of claim 17 wherein said steps of mounting said transducers include locating said transducers upon an outside diameter of said helical coil.

21. The method of claim 17 wherein said steps of mounting said transducers include locating said transducers upon an inside diameter of said helical coil.

22. The method of claim 17 wherein said steps of mounting said transducers include locating said transducers upon an upper surface or a lower surface of said helical coil and the method further includes attaching a compressive stop member to said helical coil to prevent said helical coil from becoming fully compressed.

23. The method of claim 17 further including:

mounting a fifth transducer along a third neutral axis of said helical coil;

mounting a sixth transducer along said third axis and adjacent to said fifth transducer;

mounting a seventh transducer along a fourth neutral axis of said helical coil and diametrically opposite said fifth and sixth transducers;

mounting an eighth transducer along said fourth neutral axis and adjacent to said seventh transducer; and coupling said fifth through eighth transducers in a subtractive bridge circuit arrangement.

24. The method of claim 23 further including aligning said transducers so that a line drawn between said first and third transducers is substantially orthogonal to a line drawn between said fifth and said seventh transducers.

25. A load coil comprising:

a helical spring coil element;

a first pair of transducer means for sensing a force applied to said spring, each of said first transducer means disposed upon said spring element in a diametrically opposed manner along a first neutral axis thereof; and a second pair of transducer means for sensing a force applied to said spring, each of said second transducer means disposed upon said spring element in a diametrically opposed manner along a second neutral axis thereof;

each of said transducer means including first and second transducer elements, each positioned forty-five degrees relative to a neutral axis of said spring;

said first pair of transducer means coupled as an additive bridge circuit;

said second pair of transducer means coupled as a subtractive bridge circuit.

26. The load cell of claim 25 further including a third pair of transducer means for sensing a force applied to said spring, each of said third transducer means disposed upon said spring element in a diametrically opposed manner along a third neutral axis thereof that is perpendicular to said second neutral axis, said third transducer means coupled as a subtractive bridge circuit.

* * * * *

UNITED STATES PATENT AND TRADEMARK OFFICE
CERTIFICATE OF CORRECTION

PATENT NO. : 5,714,695
DATED : February 3, 1998
INVENTOR(S) : Robert W. Bruns

It is certified that error appears in the above-identified patent and that said Letters Patent is hereby corrected as shown below:

Col. 6, line 66, "shear to F be measured." should read - - shear to be measured. - -.

Column 7, line 14, "$= k_1 Fr, \; k_1 = \frac{2r}{J}$" should read - - $= k_1 Fx, \; k_1 = \frac{2r}{J}$ - -.

Signed and Sealed this

Fifth Day of May, 1998

Attest:

BRUCE LEHMAN

Attesting Officer

Commissioner of Patents and Trademarks